US010528362B2

(12) United States Patent
Okuma

(10) Patent No.: US 10,528,362 B2
(45) Date of Patent: Jan. 7, 2020

(54) UTILIZING FUNCTION APPARATUS AND RECORDING MEDIUM

(71) Applicant: CASIO COMPUTER CO., LTD., Tokyo (JP)

(72) Inventor: Kentaro Okuma, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 224 days.

(21) Appl. No.: 15/240,193

(22) Filed: Aug. 18, 2016

(65) Prior Publication Data
US 2017/0052798 A1 Feb. 23, 2017

(30) Foreign Application Priority Data

Aug. 20, 2015 (JP) ................. 2015-162599
Jun. 30, 2016 (JP) ................. 2016-129974

(51) Int. Cl.
G06F 9/44 (2018.01)
G06F 9/445 (2018.01)
G06F 1/28 (2006.01)
G06F 3/023 (2006.01)

(52) U.S. Cl.
CPC ............ *G06F 9/44505* (2013.01); *G06F 1/28* (2013.01); *G06F 3/023* (2013.01)

(58) Field of Classification Search
CPC ..... G06F 1/32; G06F 1/28; G06F 1/26; G06F 9/44
USPC ....... 713/300, 310, 320, 321, 322, 323, 324, 713/330, 375
See application file for complete search history.

(56) References Cited

U.S. PATENT DOCUMENTS

| 4,158,230 A | * | 6/1979 | Washizuka | .......... G06F 15/0216 200/5 A |
| 5,446,906 A | * | 8/1995 | Kardach | ................. G06F 21/83 713/323 |
| 8,789,197 B1 | | 7/2014 | Wolfram et al. | |
| 2007/0050432 A1 | | 3/2007 | Yoshizawa | |
| 2008/0086780 A1 | * | 4/2008 | Chen | ..................... G06F 21/572 726/27 |

(Continued)

FOREIGN PATENT DOCUMENTS

| CN | 104678831 A | 6/2015 |
| JP | 2000-10932 A | 1/2000 |

(Continued)

OTHER PUBLICATIONS

HP Graphing Calculator Exam mode: Version 1, Sep. 30, 2013.*

(Continued)

*Primary Examiner* — Jaweed A Abbaszadeh
*Assistant Examiner* — Keshab R Pandey
(74) *Attorney, Agent, or Firm* — Fitch, Even, Tabin & Flannery LLP

(57) ABSTRACT

A utilizing function apparatus includes at least one processor, and a memory storing instructions, that when executed by the processor, cause the at least one processor to execute at least one function, based on an operation, set one of the at least one function temporarily unable to be executed, and when a time elapses after setting the one function temporarily unable to be executed, irrespective of whether a power supply of the utilizing function apparatus is on or off, keep a state where the one function temporarily unable to be executed without releasing the state.

18 Claims, 6 Drawing Sheets

(56) References Cited

U.S. PATENT DOCUMENTS

2014/0068236 A1      3/2014   de Brebisson et al.
2017/0011239 A1*     1/2017   Chapman ............... G06Q 50/00

FOREIGN PATENT DOCUMENTS

JP        2000-194664 A      7/2000
JP        2008-172683 A      7/2008

OTHER PUBLICATIONS

The extended European Search Report dated Dec. 11, 2017, issued in corresponding European Patent Application No. 16183558.2 (9 pages).
Hewlett Packard; "HP Prime Graphing Calculator"; Sep. 30, 2013; XP055431023 (4 pages).
Japanese Office Action dated Jul. 21, 2017, issued in corresponding Japanese Patent Application No. 2016-129974 and English machine translation of the same. (12 pages).
SIPO; Application No. 201610696352.4; Office Action dated Feb. 3, 2019.

* cited by examiner

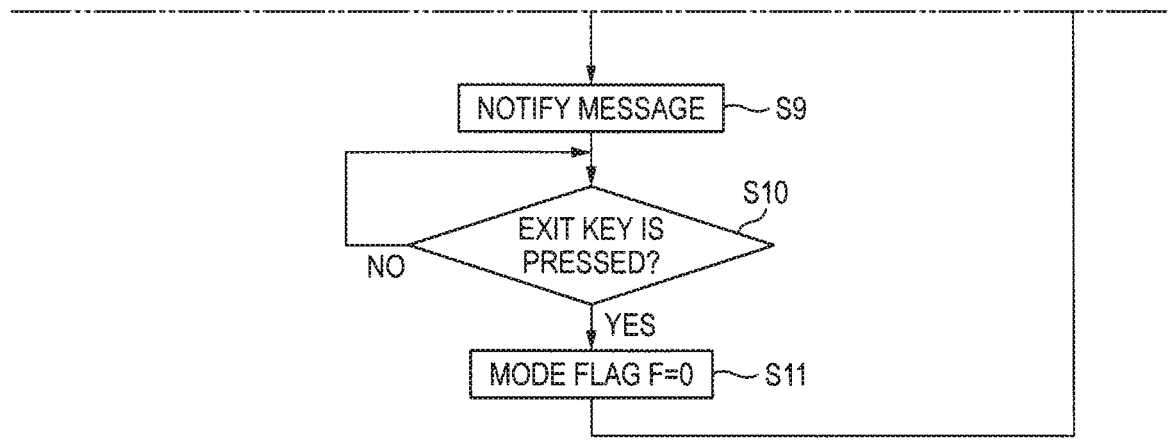

UTILIZING FUNCTION APPARATUS AND RECORDING MEDIUM

CROSS-REFERENCE TO RELATED APPLICATIONS

This application is based upon and claims the benefit of priorities from the prior Japanese Patent Application No. 2015-162599, filed on Aug. 20, 2015 and Japanese Patent Application No. 2016-129974, filed on Jun. 30, 2016, and the entire contents of which are incorporated herein by reference.

BACKGROUND

1. Technical Field

The technical field relates to a utilizing function apparatus and a recording medium capable of setting whether or not to use one of at least one executable function.

2. Description of Related Art

In Western high schools, universities and the like, when taking an achievement examination and the like, students are allowed to carry a utilizing function apparatus such as an electronic calculator capable of executing at least one function in an examination place and to make calculations and the like by using the utilizing function apparatus during the examination, in some cases. One of the at least one function includes, but is not limited to, a program function. This is a convenient function that a user can prepare a desired program in advance, store the program in an internal storage device of the electronic calculator and read out and execute the program programmed in advance, as required later, on the basis of a user's operation.

However, even when the functions are convenient in the usual using scene, it may not be preferable in some cases that the functions are executed in a specific scene, for example, during the examination. For this reason, for example, a Japanese Patent application Publication No. 2000-10932A discloses a utilizing function apparatus capable of making a setting so that one of at least one function, which can be executed by a utilizing function apparatus such as an electronic calculator, cannot be used on the basis of a user's operation.

SUMMARY OF THE INVENTION

A utilizing function apparatus according to an exemplary embodiment of the invention comprises:
at least one processor; and
a memory storing instructions, that when executed by the processor, cause the at least one processor to:
execute at least one function;
based on an operation, set one of the at least one function temporarily unable to be executed; and
when a time elapses after setting said one function temporarily unable to be executed, irrespective of whether a power supply of the utilizing function apparatus is on or off, keep a state where said one function temporarily unable to be executed without releasing the state.

A non-transitory recording medium, according to an exemplary embodiment of the invention, has a program recorded thereon that is executable to control a computer to:
execute at least one function,
based on an operation, set one of the at least one function temporarily unable to be executed, and
when a time elapses after setting said one function temporarily unable to be executed, irrespective of whether a power supply of the computer is on or off, keep a state where said one function temporarily unable to be executed without releasing the state.

BRIEF DESCRIPTION OF THE DRAWINGS

The components in the drawings are not necessarily to scale relative to each other.

DETAILED DESCRIPTION

Figure 1:
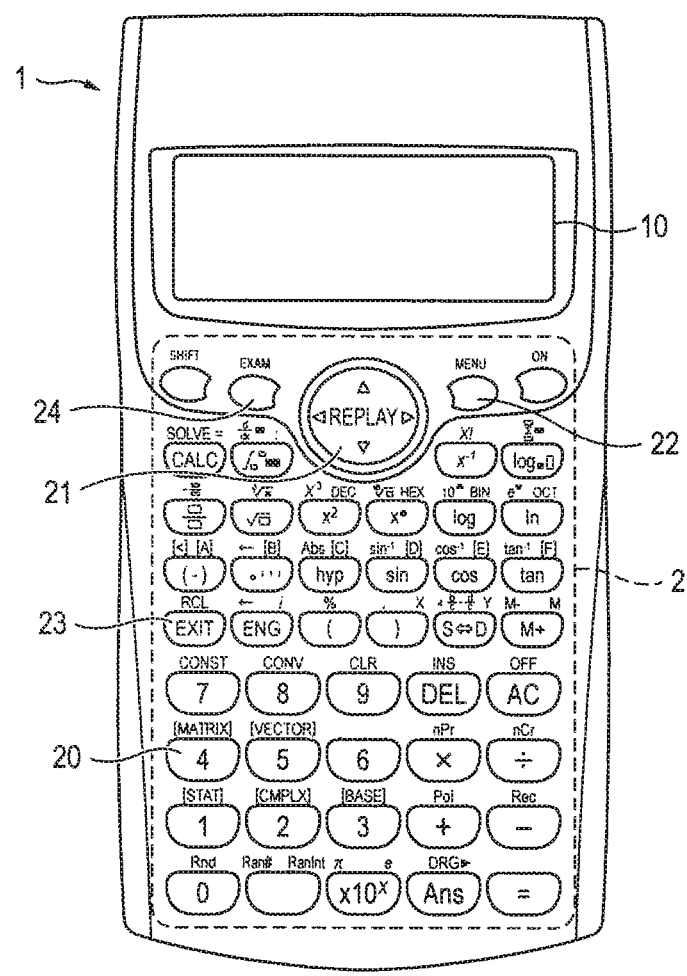
FIG. 1 is a plan view depicting a schematic outward appearance of an electronic calculator, which is an example of an electronic device.

FIG. 1 is a plan view depicting an electronic calculator, which is an example of a utilizing function apparatus according to an exemplary embodiment. In other exemplary embodiments, the utilizing function apparatus may be an electronic dictionary, an educational tablet or the like but is not limited thereto.

As shown in FIG. 1, an electronic calculator 1 has an input key group 2 including a variety of key groups and a display 10. The input key group 2 is just an example of an input device. In other exemplary embodiments, the input device may be any one of a keyboard, a touch panel and a microphone or a combination thereof but is not limited thereto. The touch panel is provided to overlap an entire display screen of the display 10 and may be configured so that a user can make an input by touching the touch panel. Also, the display 10 is just an example of an output device. In other exemplary embodiments, the output device may be any one of a projector, a printer and a speaker or a combination thereof but is not limited thereto.

The input key group 2 includes a plurality of keys configured to receive an input operation of equation constituting elements such as numerical values and computation symbols from a user and to receive an instruction operation of a variety of processing, and inherent functions are allotted to the respective keys. In the exemplary embodiment, the input key group 2 has a ten-key 20, a cursor key 21, a MENU key 22, an EXIT key 23, an EXAM key 24 and the like.

The ten-key 20 is to receive a number input. The cursor key 21 is configured to any one of four upper, lower, left and right directions in accordance with a pressed position. For example, when an upper part (a part having a mark Δ stamped thereto) of the cursor key 21 is pressed, a cursor displayed in the display screen of the display 10 can be moved upward. This is also the same for the other directions.

The MENU key 22 is a key for displaying a list of at least one function, which can be executed by the electronic calculator 1, on the display screen of the display 10. The EXIT key 23 is a key for stopping a function under execution. The EXAM key 24 is a dedicated key for setting an Exam Mode. Instead of providing the dedicated key for setting the Exam Mode, a configuration where when a plurality of arbitrary keys determined in advance is pressed simultaneously or in predetermined order, the Exam Mode is set may also be adopted.

A configuration where when all keys included in the input key group 2 are operated in combination of another key or input method, a separate function is executed may also be adopted. Also, a configuration where when the keys are executed in different execution modes, different functions are executed may also be adopted.

The display 10 consists of a liquid crystal display or the like, and is configured to display numbers, symbols, various data and the like in correspondence to operations of the input key group 2 and the like.

[Internal Configuration]

Figure 2:
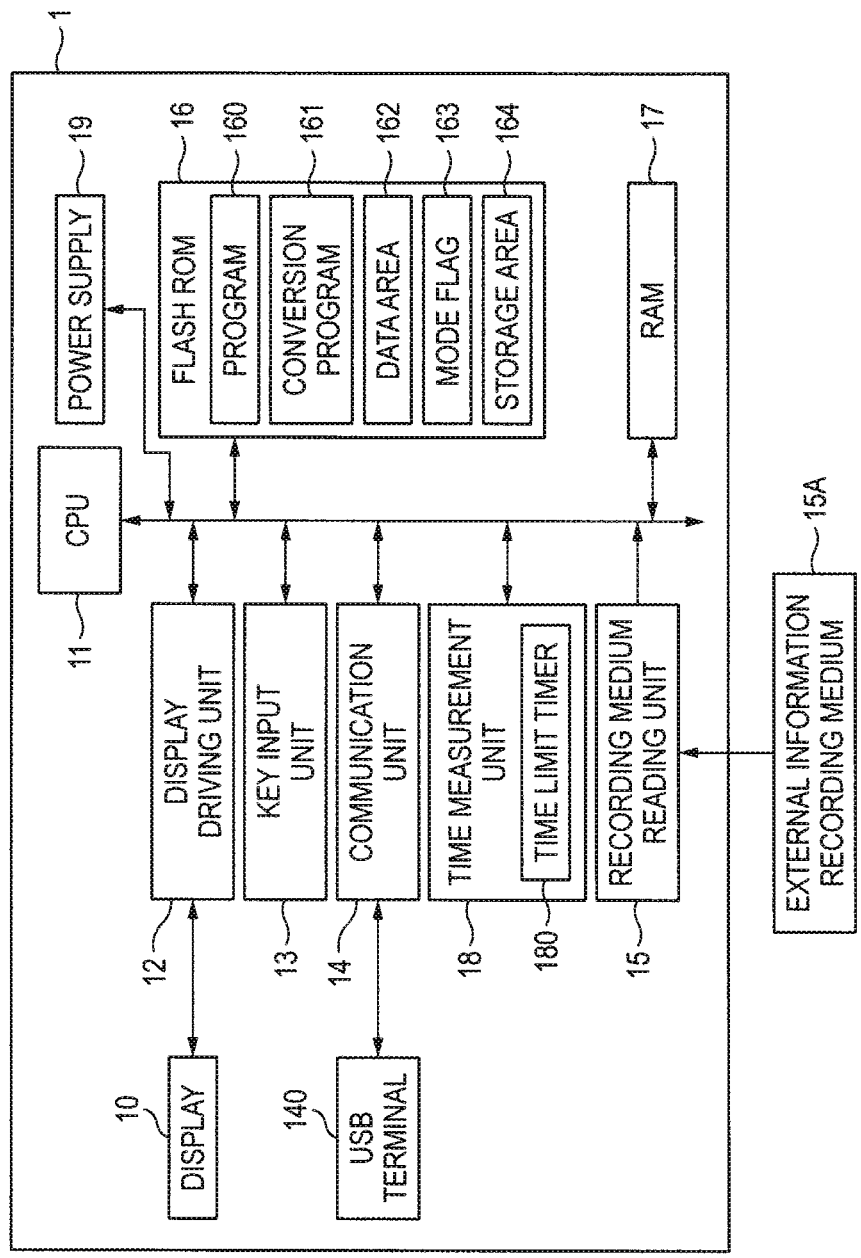
FIG. 2 is a block diagram depicting an internal configuration of the electronic calculator.

FIG. 2 is a block diagram depicting an internal configuration of the electronic calculator 1. As shown in FIG. 2, the electronic calculator 1 has a display 10, a processor (CPU: Central Processing Unit) 11, a display driving device 12, a key input unit 13, a communication unit 14, a recording medium reading unit 15, a flash ROM (Read Only Memory) 16, a RAM (Random Access Memory) 17, a time measurement unit 18 and a power supply 19.

The display driving device 12 is configured to control driving of the display 10 so as to display a variety of information on the display screen of the display 10, based on a signal from the processor 11. The display driving device 12 may be the same processor as the processor 11. Also, the display driving device 12 may be integrated with the display 10, or may be a separate processor from the processor 11.

The key input unit 13 includes the input key group 2. When each key of the input key group 2 is pressed by the user, the key input unit 13 outputs a key input signal corresponding to the pressed key to the processor 11. Based on the received key input signal, the processor 11 is configured to display a number, a symbol or the like corresponding to the key input signal on the display screen of the display 10, to execute computation corresponding to the key input signal and to display a variety of obtained data on the display screen of the display 10.

The communication unit 14 is an interface with an outside, and has a USB terminal 140 and the like, for example. The electronic calculator 1 can be connected in communication with an external device 50 such as a PC shown in FIG. 4A through the USB terminal 140 and a USB cable.

The communication connection between the electronic calculator 1 and the external device 50 is not limited to the wired connection by the USB cable and the like, and may be wireless connection by short-distance wireless communication such as NFC and Bluetooth or wireless LAN communication. Preferably, the electronic calculator 1 and the external device 50 can be connected to each other by one or more connection forms capable of accessing at least some storage area of the flash ROM 16 or RAM 17 embedded in the electronic calculator 1 or an external information recording medium 15A mounted to the recording medium reading unit 15 of the electronic calculator 1 from the external device 50 in a data-editable manner, when the electronic calculator 1 and the external device 50 are connected to each other.

The recording medium reading unit 15 is configured to read information from the external information recording medium 15A such as a memory card to be detachably mounted, on the basis of a signal from the processor 11.

Meanwhile, in the exemplary embodiment, a program to be described later may be read from the external device 50 through the communication unit 14 or may be read from the external information recording medium 15A via the recording medium reading unit 15. To the contrary, a program to be described later may be recorded to the external device 50 or the external information recording medium 15A from the electronic calculator 1 through the communication unit 14.

The flash ROM 16 has a program storage area 160 configured to store therein a variety of programs including the program of the exemplary embodiment, a conversion program storage area 161 configured to store therein a conversion program for converting a format of data and the like to a format that can be read by the external device 50 so as for the external device 50 to recognize a variety of data and the like described to a format specific to the electronic calculator 1, and a data area 162 configured to store therein data and the like necessary for computation and the like in the electronic calculator 1.

Also, the flash ROM 16 has a mode flag storage area 163 configured to store therein a mode flag F indicating whether the Exam Mode has been set, and a conversion data storage area 164, which is a storage area configured to store therein a variety of data and the like of which formats have been converted by the conversion program. Meanwhile, in the exemplary embodiment, the conversion data storage area 164 is a storage area that can be accessed from the external device 50 (external memory) in a data-editable manner, and is simply referred to as the storage area 164. Also, the RAM 17 is a kind of the storage means, and is used as a work area and the like when the processor 11 carries out a variety of processing. The time measurement unit 18 has a time limit timer 180, and is configured to measure elapsed time T after the Exam Mode is set, under control of the CPU 11, as described later.

The processor 11 is configured to control the respective units of the electronic calculator 1. The processor 11 is configured to read out one or more programs from a system program and a variety of application programs stored in the program storage area 160 of the storage unit 16, to develop the same into the work area of the RAM 17, and to execute a variety of processing including execution of the at least one function in cooperation with the programs developed into the RAM 17. Also, the processor 11 is configured to control the display driving device 12 and to display the information on the display 10, in accordance with contents of the read program or a user's operation. The output destination of the information is not limited to the display 10 and may be any one of the projector, the printer and the speaker or a combination thereof, as described above.

Figure 3:
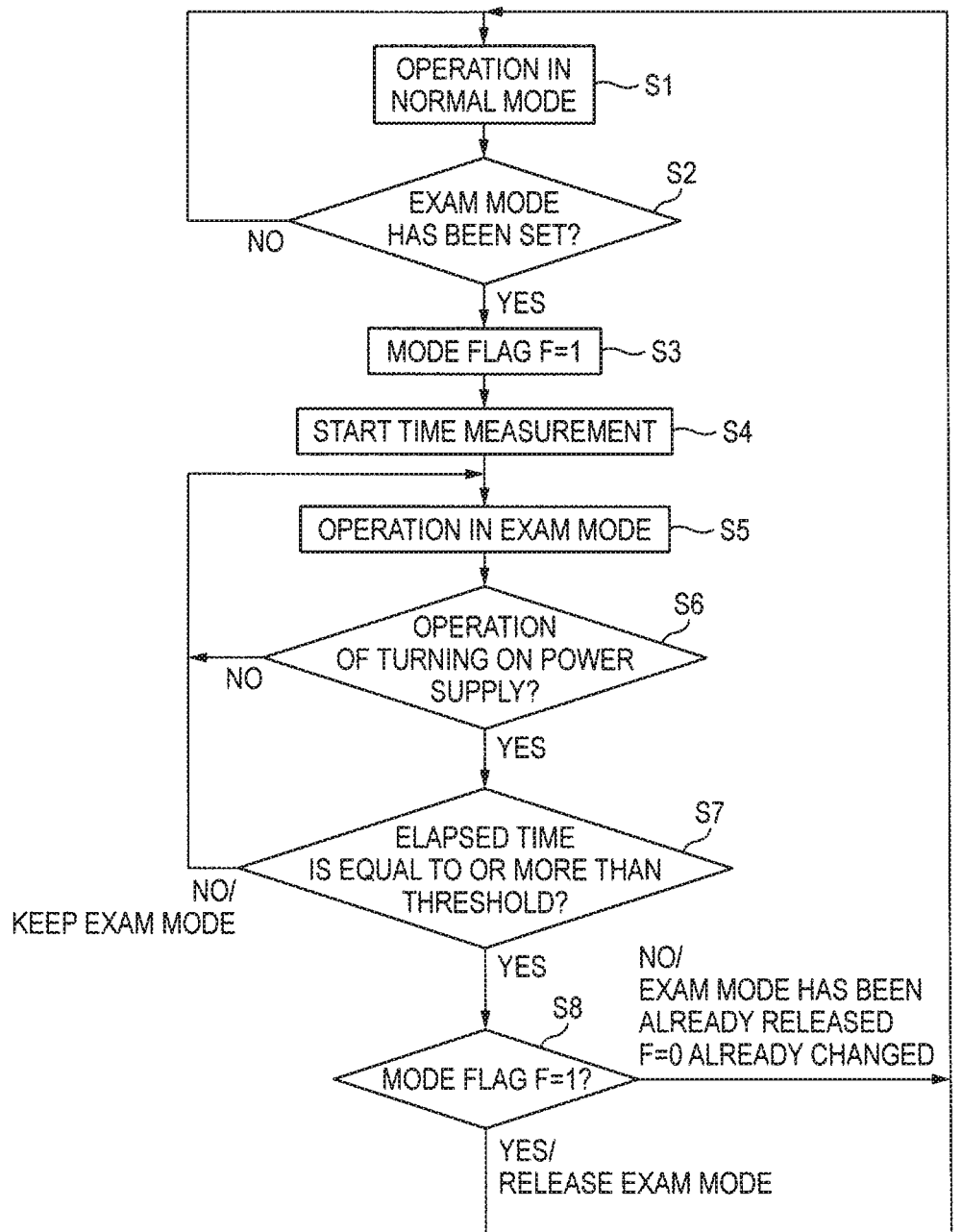
FIG. 3 is a flowchart depicting operations and the like of a CPU of the electronic calculator.

FIG. 3 is a flowchart depicting operations of the electronic calculator 1 of the exemplary embodiment. The respective units of the electronic calculator 1 are controlled by the processor 11 configured to operate in accordance with the program developed into the RAM 17, so that the operations shown in the flowchart are implemented. FIG. 3 shows an example of a plurality of functions which can be executed by the electronic calculator 1.

The power supply 19 is a battery such as a primary battery or a secondary battery, and is configured to feed power to the respective units of the electronic calculator 1.

Herein, a state where a voltage of a level equal to or higher than a preset threshold is supplied from the power supply 19 to the respective units is referred to as 'power supply on-state of the electronic calculator 1.'

At the power supply on-state, the CPU 11 controls the power supply 19, so that as a voltage of a level equal to or higher than a preset threshold, a voltage enough to perform time measurement processing by the time measurement unit 18, a variety of calculation processing by the CPU 11 and a variety of display processing on the display 10 by the display driving unit 12 is supplied from the power supply 19 to the respective units of the electronic calculator 1 such as the CPU 11, the display 10, the display driving unit 12, the time measurement unit 18 and the like.

Also, a state where a voltage of a level lower than the preset threshold is supplied from the power supply 19 to the respective units is referred to as 'power supply off-state of the electronic calculator 1.'

At the power supply off-state, the CPU 11 controls the power supply 19, so that as a voltage of a level lower than the preset threshold, a voltage, which is lower than a voltage enough for the CPU 11 to perform a variety of calculation processing except for switching of the power supply on and off states and to enable the display driving unit 12 to make a variety of displays on the display 10 and is enough for the time measurement unit 18 to perform time measurement processing, is supplied from the power supply 19 to the respective units of the electronic calculator 1 such as the CPU 11, the display 10, the display driving unit 12, the time measurement unit 18 and the like.

That is, as long as the battery serving as the power supply 19 is not removed from the electronic calculator 1 or the output voltage is not lower than the operating voltage of the electronic calculator 1 due to the power consumption, the CPU 11 controls the power supply 19, so that the voltage enough for the time measurement unit 18 to perform the time measurement processing is always supplied from the power supply 19 to the time measurement unit 18, irrespective of whether the power supply of the electronic calculator 1 is on or off.

When the AC key of the input key group 2 is pressed, the processor 11 controls the power supply 19 so that the voltage equal to or higher than the preset threshold is supplied to the respective units of the electronic calculator 1, thereby setting the power supply on-state of the electronic calculator 1 and operating the electronic calculator 1 in the normal mode.

At the normal mode, the processor 11 can execute all of the functions, which can be executed by the electronic calculator 1, on the basis of a user's operation or the like (step S1).

In the exemplary embodiment, a mode where all the functions can be used is referred to as "function utilization non-limit mode" or "normal mode."

While the electronic calculator 1 executes the functions in the normal mode with the processor 11, the processor 11 always monitors whether the Exam Mode has been set on the basis of a user's preset operation. When the Exam Mode is set during the execution of the electronic calculator 1 in the normal mode (step S2; Yes), the processor 11 changes the mode flag F stored in the mode flag storage area 163 of the flash ROM 16 to '1', thereby setting an execution mode of the electronic calculator 1 to the Exam Mode (step S3). Also, the processor 11 enables the time limit timer 180 of the time measurement unit 18 to start time measurement (step S4). In the Exam Mode, the processor 11 does not execute one or some functions of the plurality of functions, which can be executed by the electronic calculator 1 (step S5). In the exemplary embodiment, a mode where one or some functions cannot be used is referred to as "specific function utilization limit mode" or "Exam Mode."

The user's preset operation includes but is not limited to an operation that the EXAM key 24 or the like of the input key group 2 is pressed, for example. In the meantime, as a using method of the Exam Mode, the user performs an operation of setting the electronic calculator 1 to the Exam Mode before an examination starts, in accordance with a teacher's instruction at an examination place, for example. In addition to this scene, the Exam Mode may be set on the basis of the user's operation.

In the Exam Mode, the processor 11 controls the display driving device 12 to display a character string including characters of "EXAM" or "EXAMINATION" on the display 10. Thereby, the user can recognize that the electronic calculator 1 is in the Exam Mode. Also, in the Exam Mode, the electronic calculator 1 is set so that one or more functions (hereinafter, referred to as "utilization limit target functions"), which are considered as not preferable when they are executed during the examination, of the above-described program functions cannot be used. The processor 11 controls the respective units of the electronic calculator 1 to execute various functions within the set range (step S4).

Although not limited to a following example, the processor 11 does not activate the utilization limit target function in the Exam Mode even when it receives a key input signal from a key for activating the utilization limit target function of the input key group 2. Also, during the Exam Mode, when the MENU key 22 is pressed by the user and the list of the plurality of functions, which can be executed by the electronic calculator 1, is displayed on the display screen of the display 10, the processor 11 grayout-displays or does not display icons for activating one or more utilization limit target functions of the plurality of functions so that the icons cannot be selected by a cursor, or when the input device includes the touch panel, the processor does not activate a corresponding function even though a position of the touch panel corresponding to the icon is touched. Thereby, during the Exam Mode, the user can execute only simple operations such as but not necessarily limited to four arithmetic operations and the like by using the electronic calculator 1.

As described above, the voltage enough for the time measurement unit 18 to perform the time measurement processing is always supplied from the power supply 19 to the time measurement unit 18. Therefore, the time measurement processing by the time limit timer 180 of the time measurement unit 18, i.e., the processing of measuring elapsed time is continuously performed even at an always-off state, irrespective of whether the power supply of the electronic calculator 1 is on or off.

Therefore, the numerical value that is to be measured by the time limit timer 180 of the time measurement unit 18 increases over time as long as the power feeding to the time measurement unit 18 is not stopped.

In the meantime, when the power feeding to the time measurement unit 18 is stopped due to any reason, the elapsed time measured by the time limit timer 180 is reset.

Irrespective of whether the electronic calculator 1 is operating in the normal mode or the Exam mode, when the AC key of the input key group 2 is pressed at the power supply on-state of the electronic calculator 1, the processor 11 controls the power supply 19 to set the electronic calculator 1 to the power supply on-state, and when the AC key of the input key group 2 is pressed at the power supply off-state of the electronic calculator 1, the processor 11 controls the power supply 19 to supply a voltage lower than the preset threshold to the respective units of the electronic calculator 1, thereby setting the electronic calculator 1 to the power supply off-state.

When the AC key of the input key group 2 is pressed and the electronic calculator 1 is thus switched from the power supply off-state to the power supply on-state during the Exam mode, the processor 11 acquires the value of the time limit timer 180 of the time measurement unit 18, i.e., the elapsed time, and compares the elapsed time and a threshold preset by a setting through a user operation, an initial factory setting or the like (step S7).

The threshold of the elapsed time is preset to "12 hours" but is not limited thereto.

As a result of the comparison, when the elapsed time does not exceed the preset threshold (step S7: No), the processor 11 keeps the Exam mode without executing processing of releasing the Exam mode of the electronic calculator 1.

Therefore, in this case, the processor 11 does not change the value of the mode flag F stored in the mode flag storage area 163 of the flash ROM 16.

On the other hand, when the elapsed time is equal to or greater than the threshold (step S7; Yes), the processor 11 executes processing of releasing the Exam mode of the electronic calculator 1.

In this case, the processor 11 reads out the mode flag F stored in the mode flag storage area 163 of the flash ROM 16 and determines whether the Exam Mode has been set (step S8).

Herein, when the mode flag F is not '1' (step S8; No), i.e., the mode flag is '0', it indicates a case where the Exam Mode is released by separate specific function utilization limit mode releasing processing.

The separate processing will be described later.

Figure 5:
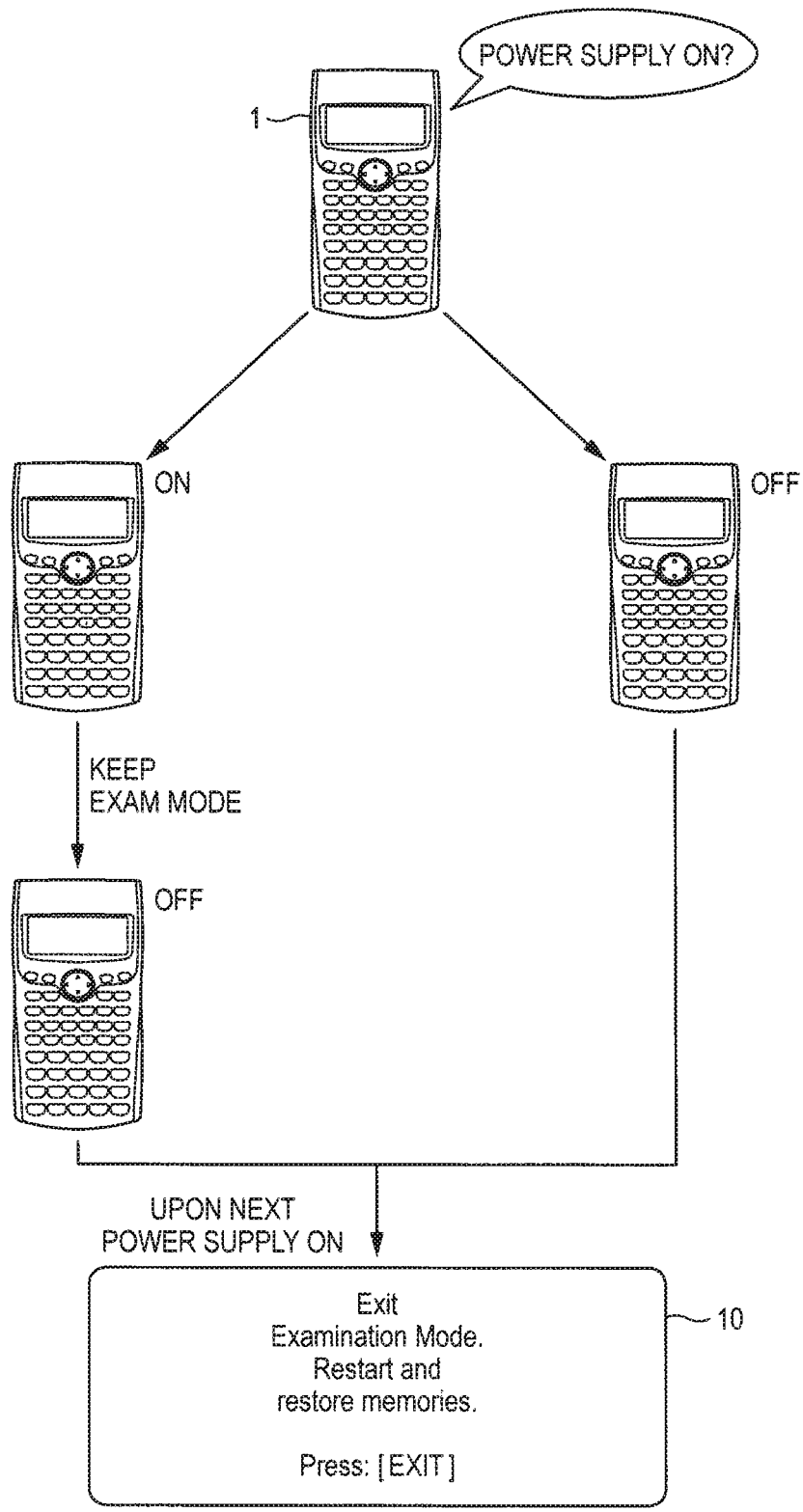
FIG. 5 is an image view depicting operations and the like of the CPU of the electronic calculator.

When the mode flag F is '1' (step S8; Yes), the processor 11 controls the display driving device 12 to display a notification message, which urges the user to press the EXIT key 23, on the display 10, as shown in a lower part of FIG. 5, for example (step S9).

Also, when it is detected that the EXIT key 23 is pressed (step S10; Yes), the processor 11 releases the Exam Mode of the electronic calculator 1 (step S11; release Exam Mode) by changing the value of the mode flag F stored in the mode flag storage area 163 of the flash ROM 16 to zero (0) and the processor 11 controls the electronic calculator 1 to operate in the normal mode (step S1).

As described above, in the exemplary embodiment, as long as the operation of pressing the AC key of the input key group 2 to switch the electronic calculator 1 from the power supply off-state to the power supply on-state is not performed during the Exam mode, the processor 11 does not compare the elapsed time, which is indicated by the time limit timer 180 of the time measurement unit 18, and the threshold. Therefore, the processor 11 does not execute the processing of releasing the Exam mode of the electronic calculator 1 on the basis of the comparison result.

That is, the processor 11 is configured to always compare the elapsed time, which is indicated by the time limit timer 180 of the time measurement unit 18, and the threshold, irrespective of whether the power supply of the electronic calculator 1 is on or off, and when the elapsed time exceeds the threshold, the processor 11 does not immediately execute any processing, specifically, the processing of releasing the Exam mode.

In other words, when the elapsed time, which is indicated by the time limit timer 180 of the time measurement unit 18, exceeds the threshold, the processor 11 keeps the operation mode at that time, i.e., the Exam mode.

When the elapsed time, which is indicated by the time limit timer 180 of the time measurement unit 18, exceeds the threshold, particularly, when the power supply of the electronic calculator 1 is on, there is a possibility that the user is using the electronic calculator 1.

At this time, by keeping the Exam Mode, the data input to the electronic calculator 1 by the user, a result of processing such as computation performed using the electronic calculator 1, and the like are not erased. Therefore, it is possible to continuously use the data and setting input already at that time.

Figure 4A:
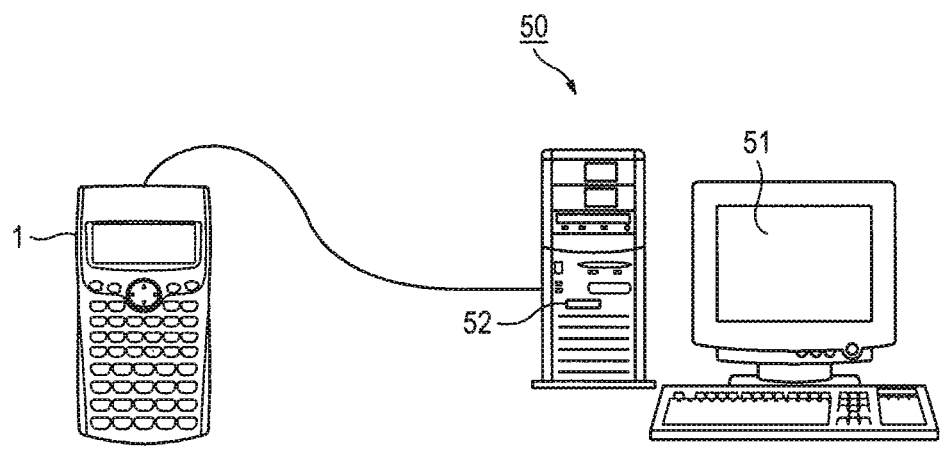
FIG. 4A depicts a state where the electronic calculator and an external device are connected to each other.

Subsequently, the separate specific function utilization limit mode releasing processing is briefly described. The processor 11 always monitors whether USB connection has been established between the electronic calculator 1 and the external device 50 while the power supply of the electronic calculator 1 is on. As shown in FIG. 4A, when the USB terminal 140 of the electronic calculator 1 and a USB terminal (not shown) of the external device 50 are connected to each other by a USB cable, the USB connection is established.

When the establishment of the USB connection with the external device 50 is detected, the processor 11 of the electronic calculator 1 acquires first information about predetermined items (for example, a remaining capacity A1 of the storage area 164, and the like) of the storage area 164 of the flash ROM 16. Also, when the USB connection is established between the electronic calculator 1 and the external device 50, a part of the storage area of the flash ROM 16 of the electronic calculator 1 operates as an external storage capacity of the external storage device 50, and can be accessed by a processor 52 of the external device 50, as described later.

Figure 4B:
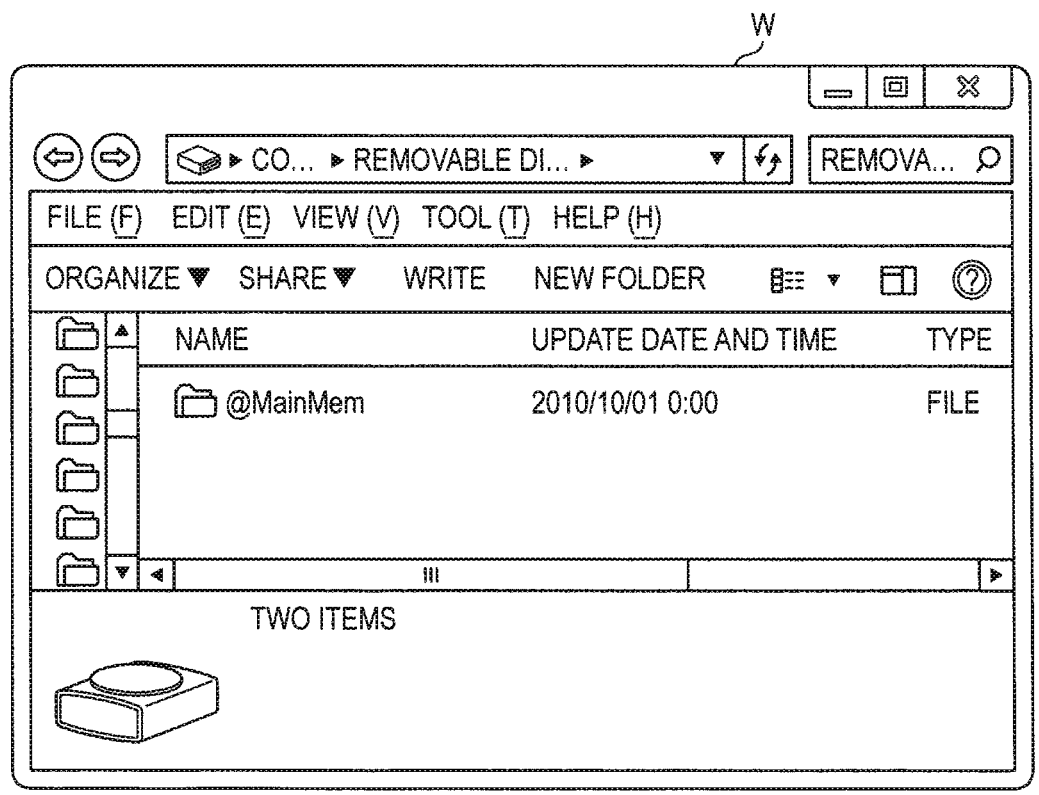
FIG. 4B depicts a storage state in the electronic calculator displayed on a display unit of the external device.

In the meantime, when the establishment of the USB connection with the electronic calculator 1 is detected, the processor 52 of the external device 50 activates a file manager function, which is one of standard functions of the basic software installed in the external device 50, automatically or on the basis of a user's operation. When the file manager is activated, a window W of "computer" is displayed on a display unit 51 by the processor 52 of the external device 50, as shown in FIG. 4B. The processor 52 of the external device 50 accesses the storage area 164 of the flash ROM 16 of the electronic calculator 1 on the basis of a user's operation, and displays a list of files stored in the storage area 164 in the window W being displayed on the display unit 51.

At this state, the processor 52 of the external device 50 adds one or more new files (newly adds data) to the storage area 164, deletes (erase the data) one or more files already stored in the storage area 164 or rewrites a file (changes the data) on the basis of the user's operation. When editing the file or data in the storage area 164, any file having a file size, which is not zero (0), of a text format may be added to the storage area 164 of the flash ROM 16 of the electronic calculator 1, as a dummy file.

The processor 52 of the external device 50 monitors all the time whether the USB connection between the external device 50 and the electronic calculator 1 is released while the power supply of the external device 50 is on. The processor 52 of the external device 50 releases logical connection (USB connection) between the external device 50 and the electronic calculator 1, based on a user's preset operation.

When the release of the USB connection with the external device 50 is detected, the processor 11 of the electronic calculator 1 acquires second information about predetermined items (for example, a remaining capacity A2 of the storage area 164 and the like) of the storage area 164 of the flash ROM 16. The items relating to the second information are the same as the items relating to the first information.

The processor 11 of the electronic calculator 1 compares the second available capacity A2, which is the second information, and the first available capacity A1, which is the first information. When it is determined that the two available capacities A1, A2 are different, the processor 11 of the electronic calculator 1 controls the display driving device 12 to display a notification message, which urges the user to press the EXIT key 23, on the display 10, as shown in the lower part of FIG. 5, for example. Also, when it is determined that the EXIT key 23 is pressed, the processor 11 releases the Exam Mode of the electronic calculator 1.

In this way, the electronic calculator 1 of the exemplary embodiment executes in parallel the plurality of specific function utilization limit mode releasing processing. Therefore, there is a case where in step S12, when the power supply of the electronic calculator 1 becomes on, the separate specific function utilization limit mode releasing processing has been already executed, so that the mode flag F is 0, i.e., the Exam Mode has been already released. Also, in the exemplary embodiment, one kind of the separate specific function utilization limit mode releasing processing has been described. However, in other exemplary embodiments, one or more separate specific function utilization limit mode releasing processing may be executed in parallel.

While various embodiments have been described herein above, it is to be appreciated that various changes in form and detail may be made without departing from the spirit and scope of the invention(s) presently or hereafter claimed.

The invention claimed is:

1. A utilizing function apparatus comprising:
at least one processor; and
a memory storing instructions, that when executed by the processor, cause the at least one processor to:
execute at least one function;
based on an operation, set one of the at least one function to a state of being temporarily unable to be executed;
determine whether a power supply of the utilizing function apparatus becomes an on state from an off state during the state;
in a case where it is determined that the power supply of the utilizing function apparatus becomes the on state from the off state during the state, acquire an elapsed time that is a time that elapses after setting said one function temporarily unable to be executed;
compare the elapsed time and a threshold so as to determine whether the elapsed time exceeds the threshold; and
(i) in a case where it is determined that the elapsed time exceeds the threshold, release the state, and (ii) in a case where it is determined that the elapsed time does not exceed the threshold, not release and keep the state.

2. The utilizing function apparatus according to claim 1, wherein the at least one processor, under control of the instructions, sets said one function, which is not preferable to be executed during an examination, temporarily unable to be executed, based on the operation inputted before the examination.

3. The utilizing function apparatus according to claim 1, wherein when executed by the at least one processor, the instructions cause the processor to further: control a display to output an execution result of said one function, based on an operation via a keyboard.

4. The utilizing function apparatus according to claim 1, further comprising:
a keyboard configured to receive a user's operation; and
a display to which at least one execution result of the at least one function is to be output, based on the user's operation.

5. The utilizing function apparatus according to claim 1, wherein the at least one processor, under control of the instructions, does not acquire and compare the elapsed time to the threshold while the power supply of the utilizing function apparatus keeps being on without being turned off after the state is set.

6. The utilizing function apparatus according to claim 1, wherein the at least one processor, under control of the instructions,
displays on the display a notification message to urge a user to press a specified key when the power supply of the utilizing function apparatus becomes the on state from the off state during the state, and
releases the state when it is detected that the specified key is pressed.

7. The utilizing function apparatus according to claim 1, wherein the at least one processor, under control of the instructions, does not release the state where said one function is temporarily unable to be executed so as to maintain the state while the power supply of the utilizing function apparatus keeps being on without being turned off after the state is set.

8. A non-transitory recording medium having a program recorded thereon that is executable to control a computer to:
execute at least one function,
based on an operation, set one of the at least one function to a state of being temporarily unable to be executed,
determine whether a power supply of the utilizing function apparatus becomes an on state from an off state during the state;
in a case where it is determined that the power supply of the utilizing function apparatus becomes the on state from the off state during the state, acquire an elapsed time that is a time that elapses after setting said one function temporarily unable to be executed;
compare the elapsed time and a threshold so as to determine whether the elapsed time exceeds the threshold; and
(i) in a case where it is determined that the elapsed time exceeds the threshold, release the state, and (ii) in a case where it is determined that the elapsed time does not exceed the threshold, not release and keep the state.

9. The non-transitory recording medium according to claim 8, wherein the computer, under control of the program, set said one function, which is not preferable to be executed during an examination, temporarily unable to be executed, based on the operation inputted before the examination.

10. The non-transitory recording medium according to claim 8, wherein the program is further executable to control the computer to control a display to output an execution result of said one function, based on an operation via a keyboard.

11. The non-transitory recording medium according to claim 8, wherein the computer, under control of the program, does not acquire and compare the elapsed time to a threshold as long while the power supply of the utilizing function apparatus keeps being on without being turned off after the state is set.

12. The non-transitory recording medium according to claim 8, wherein the computer, under control of the program,
displays on the display a notification message to urge a user to press a specified key when the power supply of the utilizing function apparatus becomes the on state from the off state during the state, and
releases the state when it is detected that the specified key is pressed.

13. The utilizing function apparatus according to claim 7, wherein the at least one processor, under control of the instructions, does not release the state so as to maintain the state while the power supply of the utilizing function apparatus keeps being on without being turned off after the state is set, irrespective of whether the elapsed time, that is the time elapsed after the setting of said one function to the state of being temporarily unable to be executed, exceeds the threshold.

14. The utilizing function apparatus according to claim 13, wherein the at least one processor, under control of the instructions, releases the state in a case where it is detected that (i) the power supply of the utilizing function apparatus becomes the on state from the off state, and (ii) the elapsed time exceeds the threshold.

15. The non-transitory recording medium according to claim 8, wherein the computer, under control of the program, does not release the state where said one function is temporarily unable to be executed so as to maintain the state while the power supply of the utilizing function apparatus keeps being on without being turned off after the state is set.

16. The non-transitory recording medium according to claim 15, wherein the computer, under control of the program, does not release the state so as to maintain the state while the power supply of the utilizing function apparatus keeps being on without being turned off after the state is set, irrespective of whether the elapsed time, that is the time elapsed after the setting of said one function to the state of being temporarily unable to be executed, exceeds the threshold.

17. The non-transitory recording medium according to claim 16, wherein the computer, under control of the program, releases the state in a case where it is detected that (i) the power supply of the utilizing function apparatus becomes the on state from the off state, and (ii) the elapsed time exceeds the threshold.

18. A method of operating a utilizing function apparatus, the method comprising:
   executing at least one function;
   based on an operation, setting one of the at least one function to a state of being temporarily unable to be executed;
   determining whether a power supply of the utilizing function apparatus becomes an on state from an off state during the state;
   in a case where it is determined that the power supply of the utilizing function apparatus becomes the on state from the off state during the state, acquiring an elapsed time that is a time that elapses after setting said one function temporarily unable to be executed;
   comparing the elapsed time and a threshold so as to determine whether the elapsed time exceeds the threshold; and
   (i) in a case where it is determined that the elapsed time exceeds the threshold, releasing the state, and (ii) in a case where it is determined that the elapsed time does not exceed the threshold, not releasing and keeping the state.

* * * * *